US005577704A

United States Patent [19]
Pierce et al.

[11] Patent Number: 5,577,704
[45] Date of Patent: Nov. 26, 1996

[54] ADJUSTABLE SUPPORT FOR SMALL ENCLOSURE

[75] Inventors: Susanne M. Pierce, Menlo Park; Andrew T. Liu, San Francisco; John A. Howard, Palo Alto, all of Calif.

[73] Assignee: Apple Computer, Inc., Cupertino, Calif.

[21] Appl. No.: 403,317

[22] Filed: Mar. 14, 1995

[51] Int. Cl.⁶ ................................................. A47G 29/00
[52] U.S. Cl. ............................................ 248/688; 248/923
[58] Field of Search ................................. 248/923, 922, 248/920, 919, 393, 371, 133, 349; 181/143, 150, 153, 199; 381/88, 90, 188, 205

[56] References Cited

U.S. PATENT DOCUMENTS 3,486,629  12/1969  Slaga ..................................... 248/349.1
3,954,244   5/1976  Gopstein ............................... 248/349.1

OTHER PUBLICATIONS

Lowric, Adjustable Tilt Mechanism For Data–Entry Terminal, Jun. 81, 186 & 187.

Primary Examiner—Ramon O. Ramirez
Assistant Examiner—Willie W. Berry, Jr.
Attorney, Agent, or Firm—David J. Larwood

[57]  ABSTRACT

An enclosure with a horizontal axis of rotation near the base of the enclosure, plus an adjustable foot to form a three-point support. The adjustable foot can be moved in a circle around a horizontal axis of rotation, thereby providing a range of stable positions. The adjustment mechanism includes a detent and matching depressions to allow certain fixed adjustments which will not slip.

5 Claims, 8 Drawing Sheets

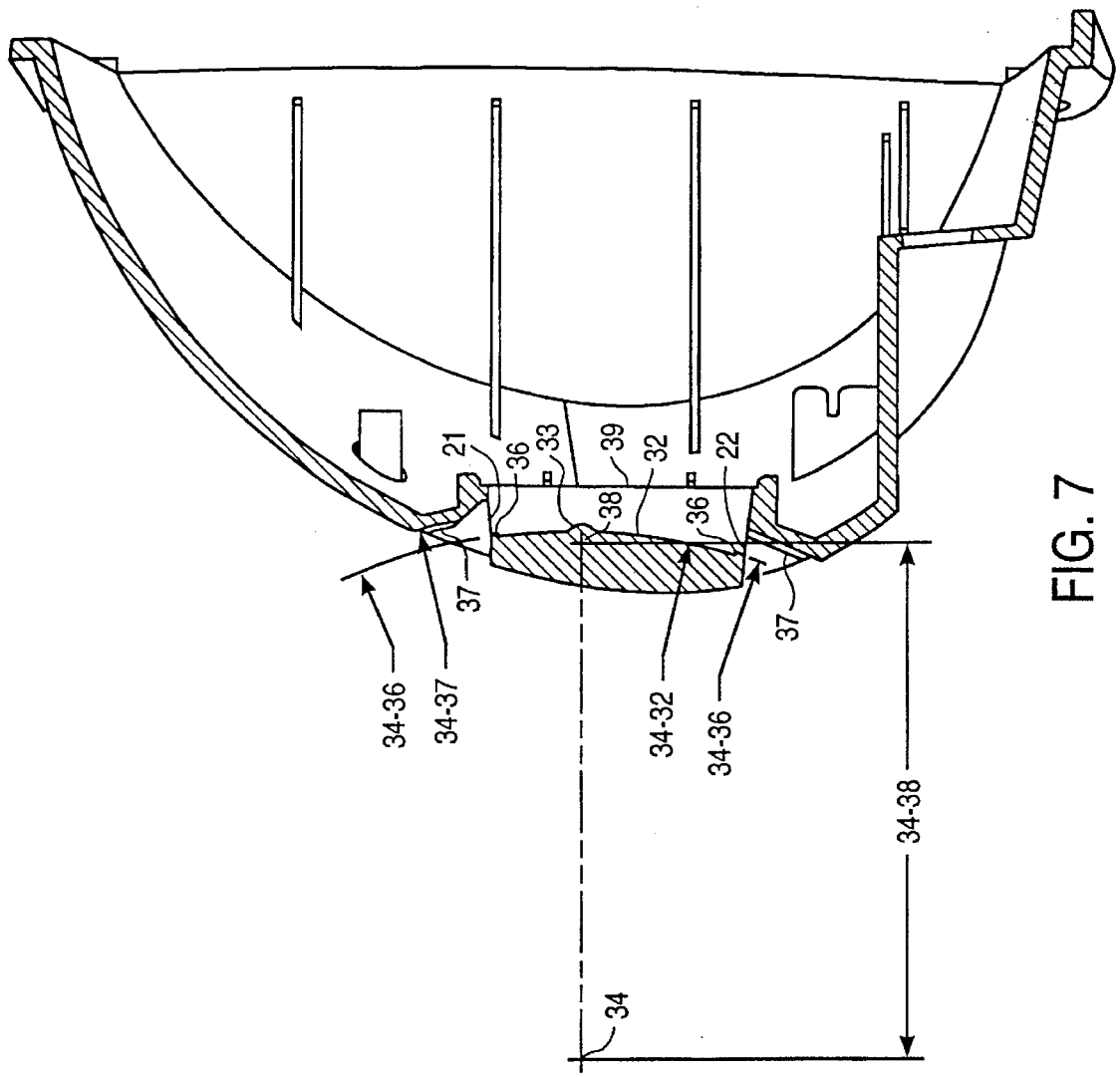
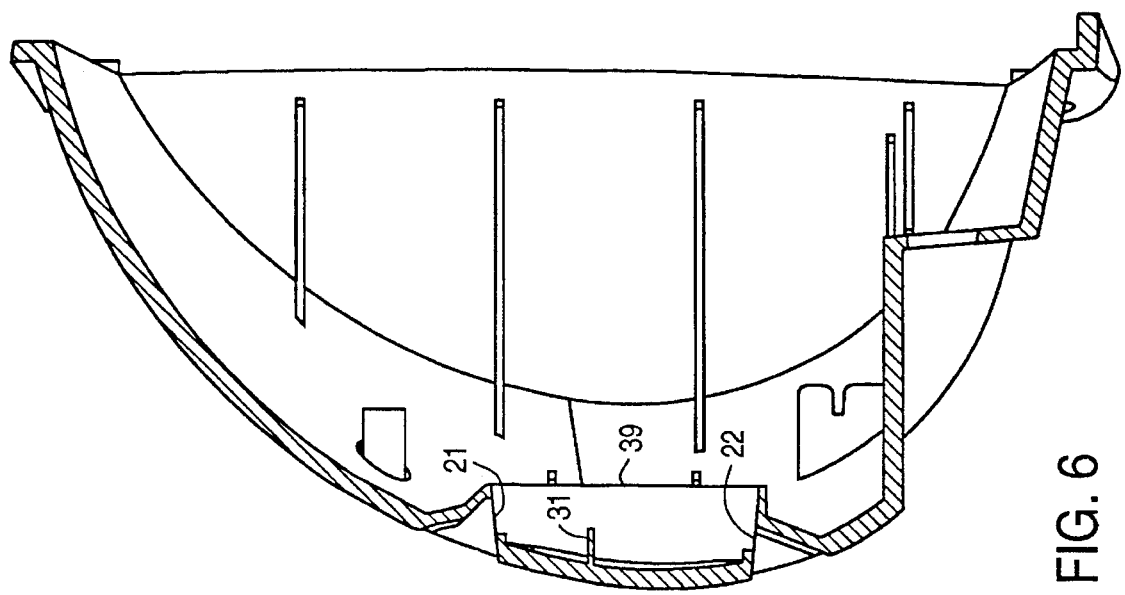
FIG. 7
FIG. 6

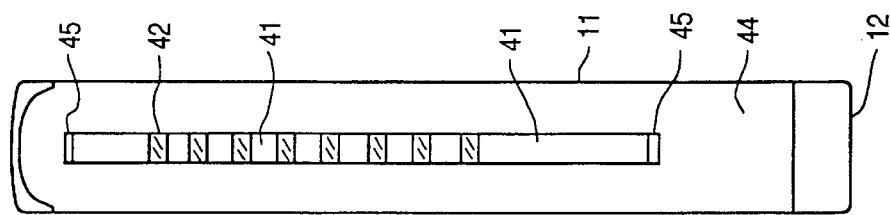
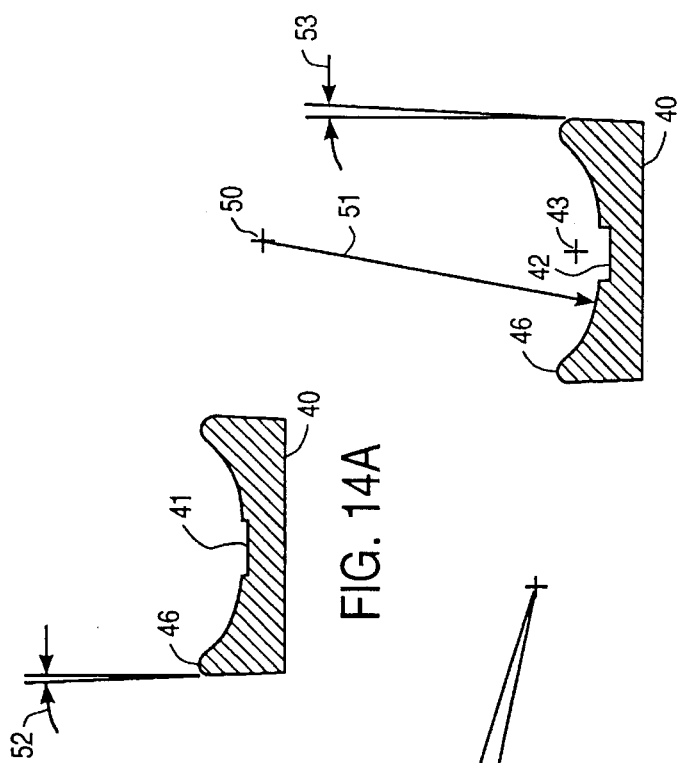
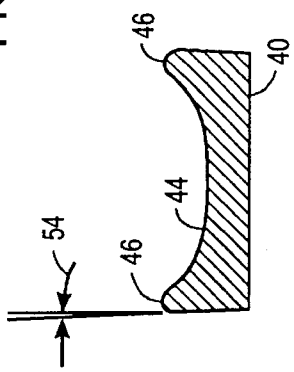
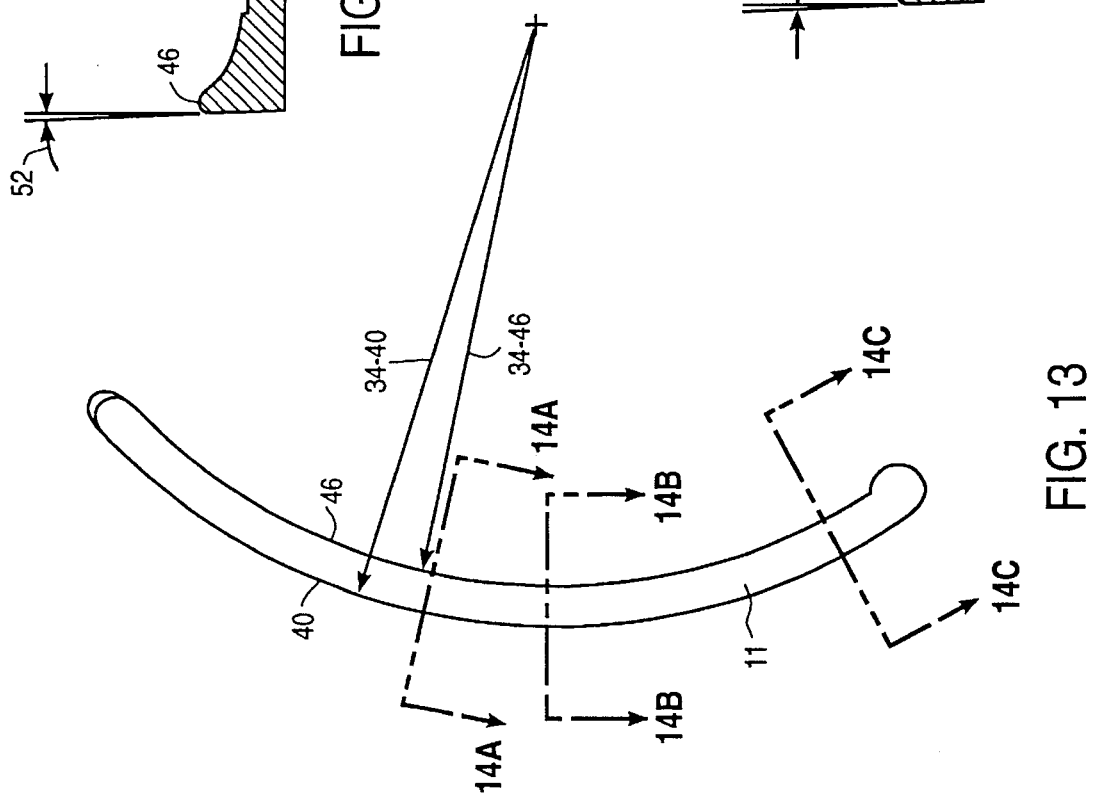

5,577,704

ADJUSTABLE SUPPORT FOR SMALL ENCLOSURE

FIELD OF THE INVENTION

This invention relates to the field of small appliances which may be positioned at different angles. This invention is particularly useful for a small speaker enclosure but would be useful as well for a telephone handset, television screen or other devices.

BACKGROUND OF THE INVENTION

A variety of devices in common use are designed to be directed toward a user but in a variety of environments. Computer monitors, especially larger monitors, often include tilt and swivel functions to enable a user to position the screen at an advantageous angle. Portable computers include a screen which can be tipped at an angle of the user's choice. The angle of choice often varies even for the same user, depending on the environment in which the computer is to be used. Telephones, portable televisions, audio speakers and many other devices can be designed to include various positioning devices to stabilize the device at an angle which is advantageous for a particular use at a particular time.

Audio speakers have traditionally been manufactured as some form of box, in other words, a rectangular prism. Certain speakers have adopted other shapes, such as an angled plane (many large electrostatic speakers) or inverted cone, but the box is the most common. Virtually all speakers are designed in a fixed enclosure, designed to rest in a fixed position, generally on a horizontal surface. Certain speakers are designed to be mounted in a wall, ceiling or in a car, but again these are designed to be used in a fixed position. If any position adjustment is desired, the only real degree of freedom is a rotational axis around a vertical axis. Thus a speaker can be rotated to the left or right, but generally cannot be tipped.

In certain installations, a speaker may be mounted at a desired angle, for example by fixing the speaker to a mounting bracket or suspending it from wires, allowing a wide degree of angular selection. However, the final result is a fixed angle, useful only for that particular installation. Changing the angle of the speaker requires a new installation, which is not an easy matter.

If a user desired to tip a speaker upward or downward, for example if positioned on a low shelf or a high shelf, respectively, the user had to resort to inserting wedges of various sorts. For many speakers, if the center of gravity is not low, this can result in an unstable position which requires additional stabilization.

This lack of adjustability is particularly limiting for relatively small speakers, such as those less than about one cubic foot in contained volume. This lack of adjustability pertains to a variety of other small enclosures or devices, such as telephone equipment and particularly television or computer screens.

SUMMARY OF THE INVENTION

The new invention provides an enclosure with a horizontal axis of rotation near the base of the enclosure, plus an adjustable foot to form a three-point support. The adjustable foot can be moved in a circle around a horizontal axis of rotation, thereby providing a range of stable positions. The adjustment mechanism includes a detent and various matching depressions to allow certain fixed adjustments which will not slip.

One object of the new invention is to provide an adjustment mechanism so a small enclosure such as a speaker can be tipped to one of several angles.

This and other objects and advantages of the invention, as well as the details of an illustrative embodiment, will be more fully understood from the following specification and drawings.

BRIEF DESCRIPTION OF THE DRAWINGS

FIGS. 6 and 7 illustrate vertical cross sections of the enclosure showing details of the detent mechanism and the path for the adjustable foot.

FIG. 13 illustrates a right side elevation view of the foot.

FIGS. 14A, 14B and 14C illustrate horizontal cross sections of the foot taken at various positions along the foot, showing details of the detent mechanism.

FIG. 15 illustrates a view of the rear-facing portion of the foot, the inner portion of the curve.

DESCRIPTION OF THE PREFERRED EMBODIMENTS

The device described below provides several advantages over earlier devices. An angle-adjustment feature is built directly into the speaker stand to allow the user to set the optimal speaker position. The angle-adjustment feature offers discrete settings which are built directly into the plastic without any additional parts. The angle-adjustment feature is designed so that at any position, the speaker maintains a solid three-point stance. The angle-adjustment feature is an integral part of the speaker cabinet and is designed to eliminate any degrading effects on sound quality.

One particularly preferred embodiment is found in the commercially available device known as the AppleDesign Powered Speakers II, Model No. M2497, available from Apple Computer, Cupertino, Calif. These speakers were first introduced on Mar. 14, 1994.

Figure 1:
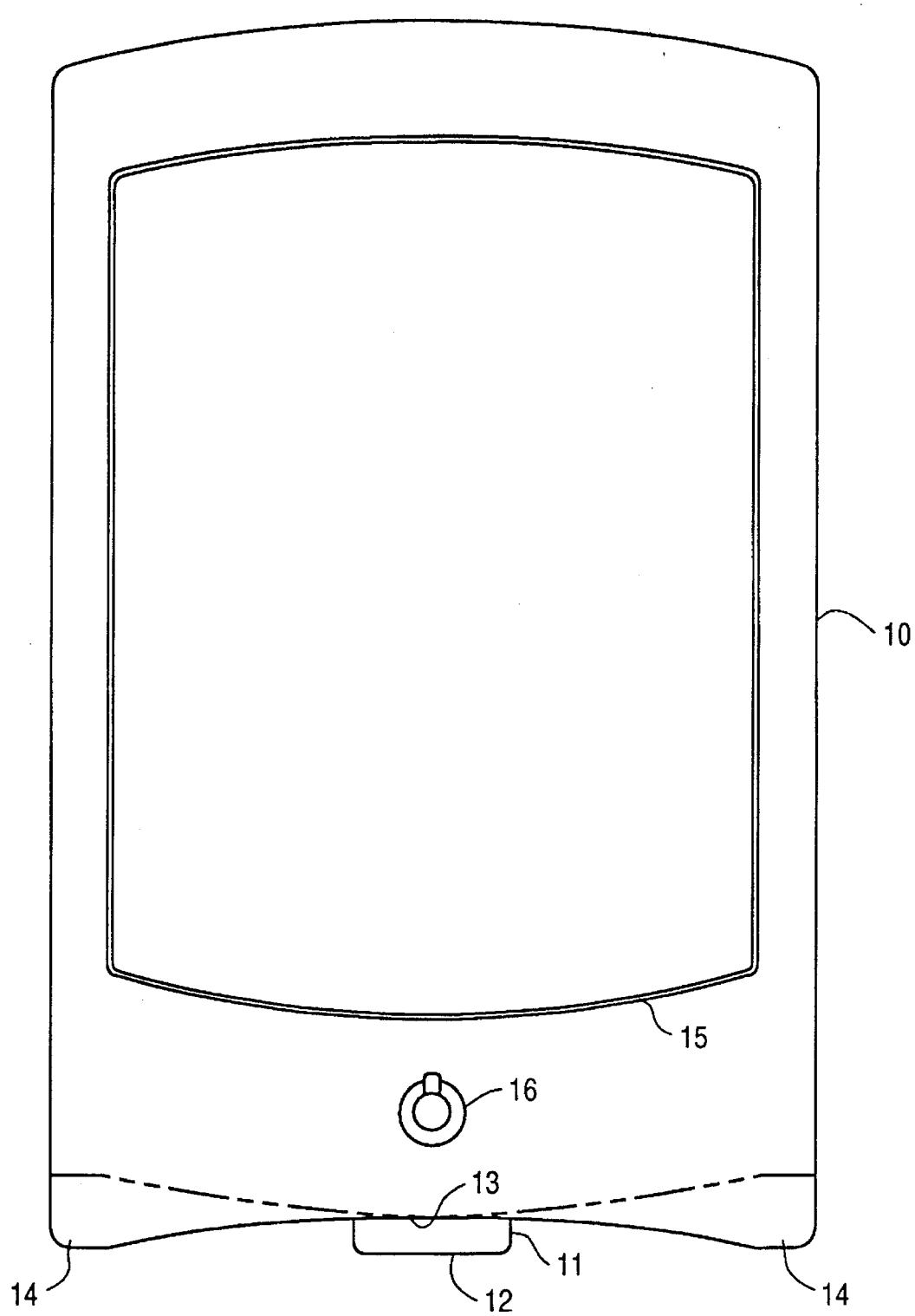
FIG. 1 illustrates a front elevation view of a representative enclosure, a speaker.
Figure 2:
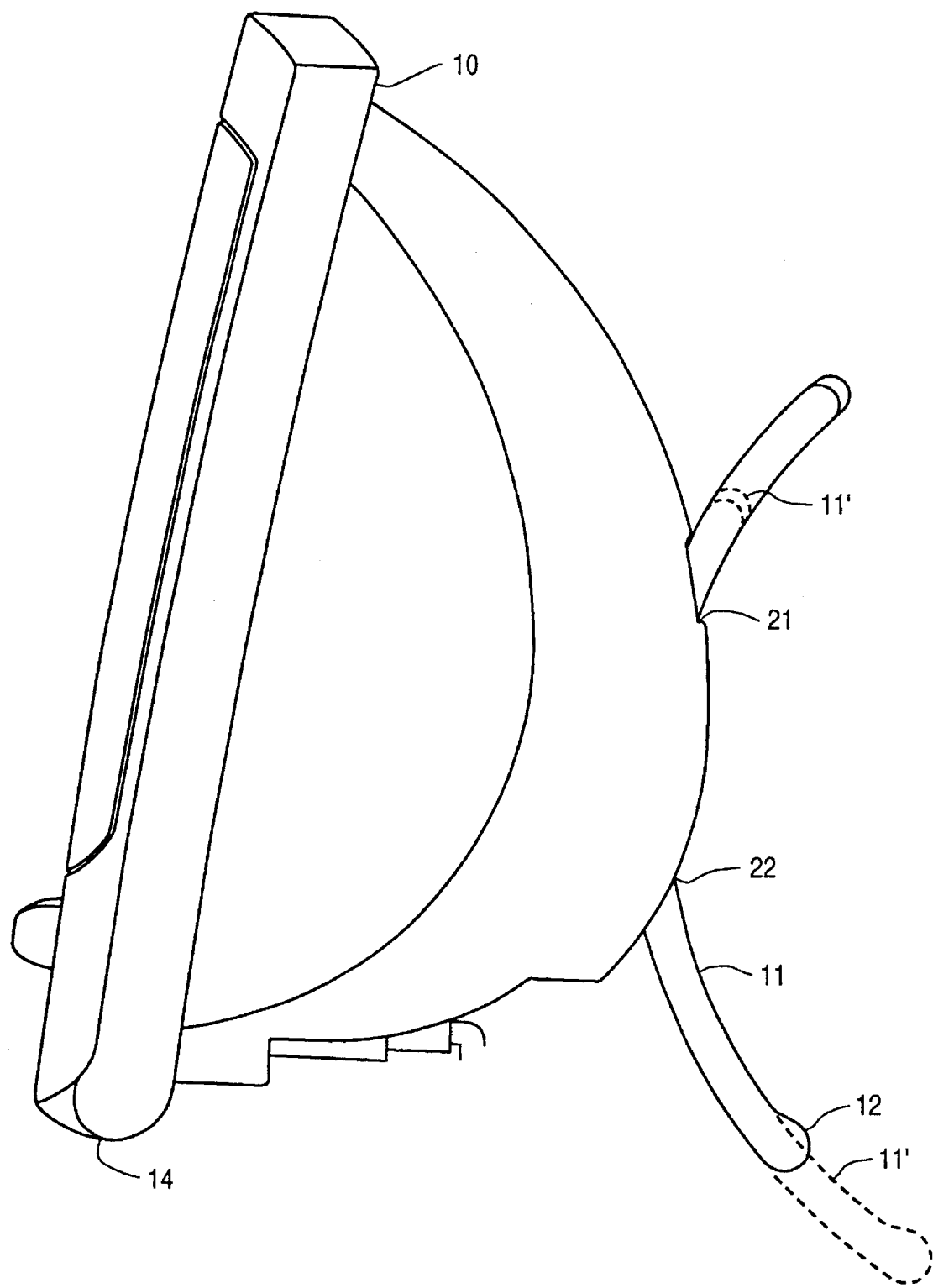
FIG. 2 illustrates a right side elevation view of the speaker of FIG. 1 showing the enclosure and the adjustable foot.
Figure 3:
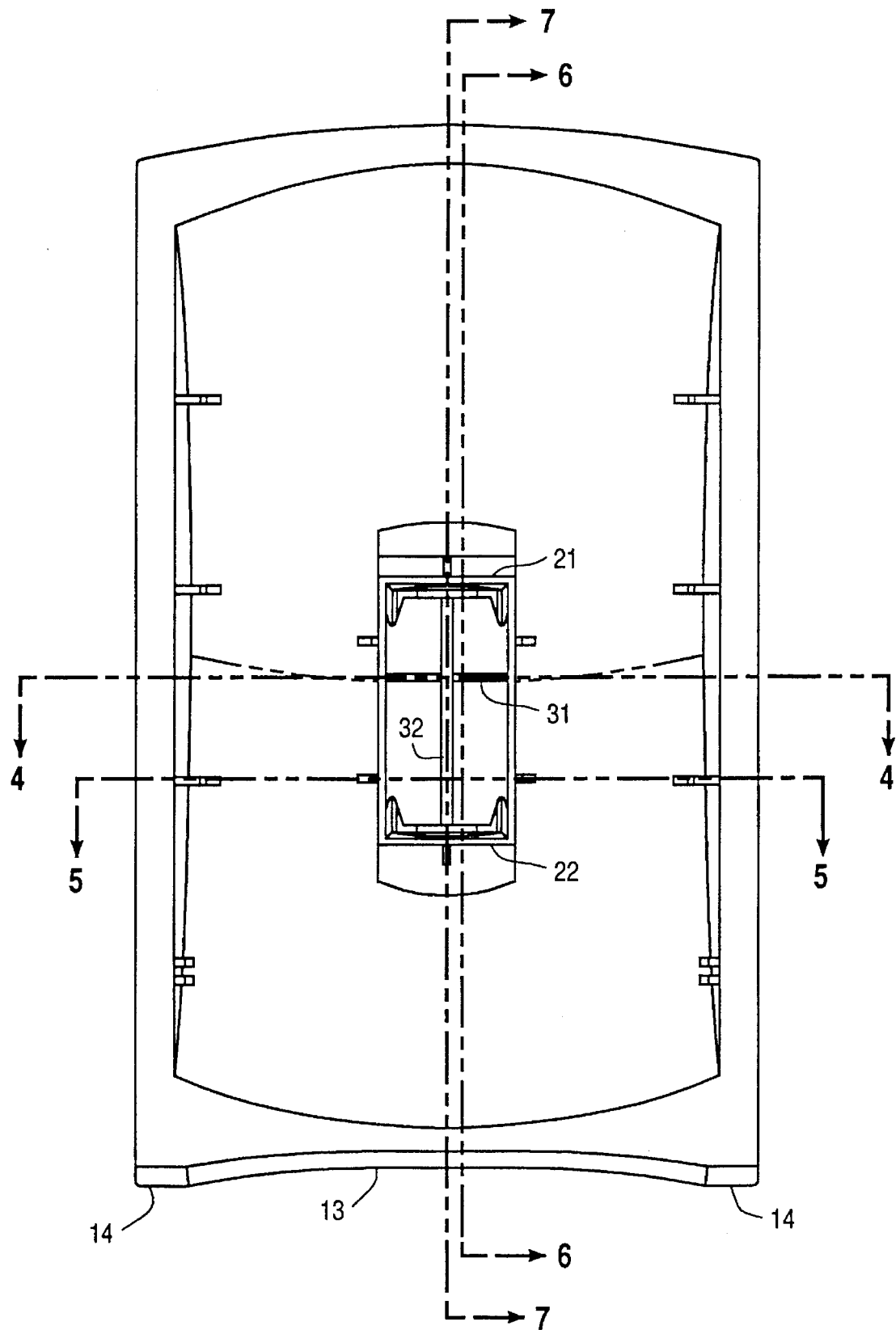
FIG. 3 illustrates a rear elevation view of the speaker of FIG. 1 showing the enclosure and some of the interior details of the enclosure where the foot moves through the enclosure.
Figure 4:
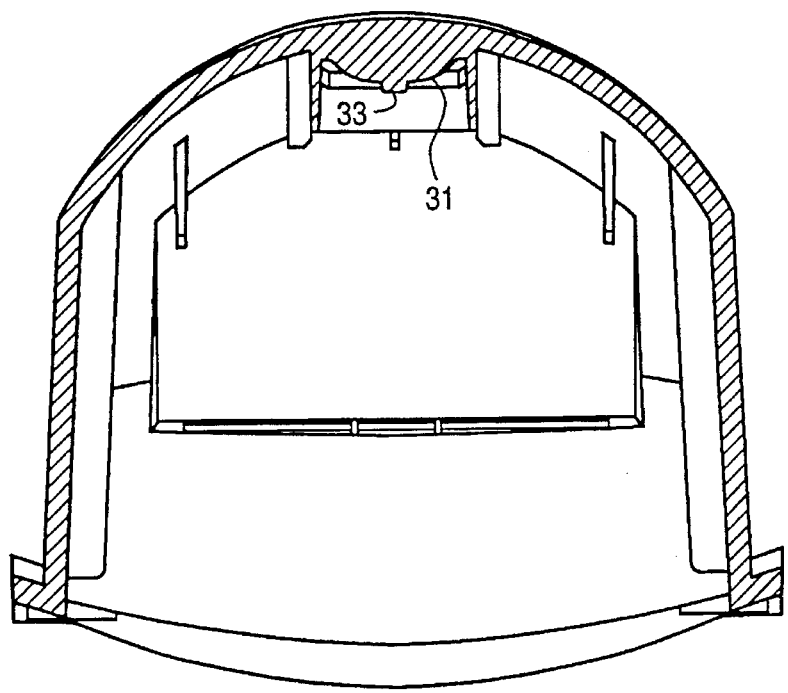
FIG. 4 and 5 illustrate horizontal cross sections of the enclosure showing details of the detent mechanism.
Figure 5:
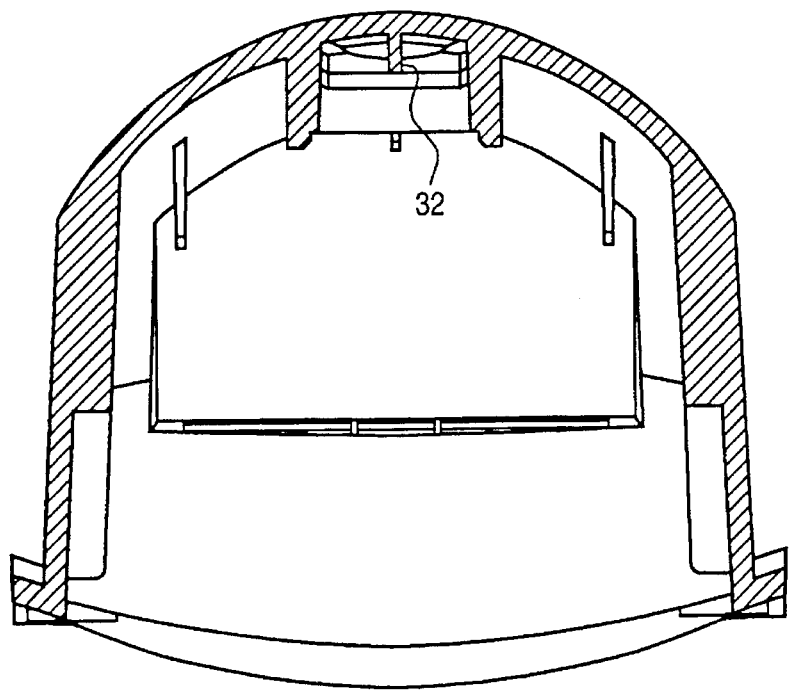
Figure 8:
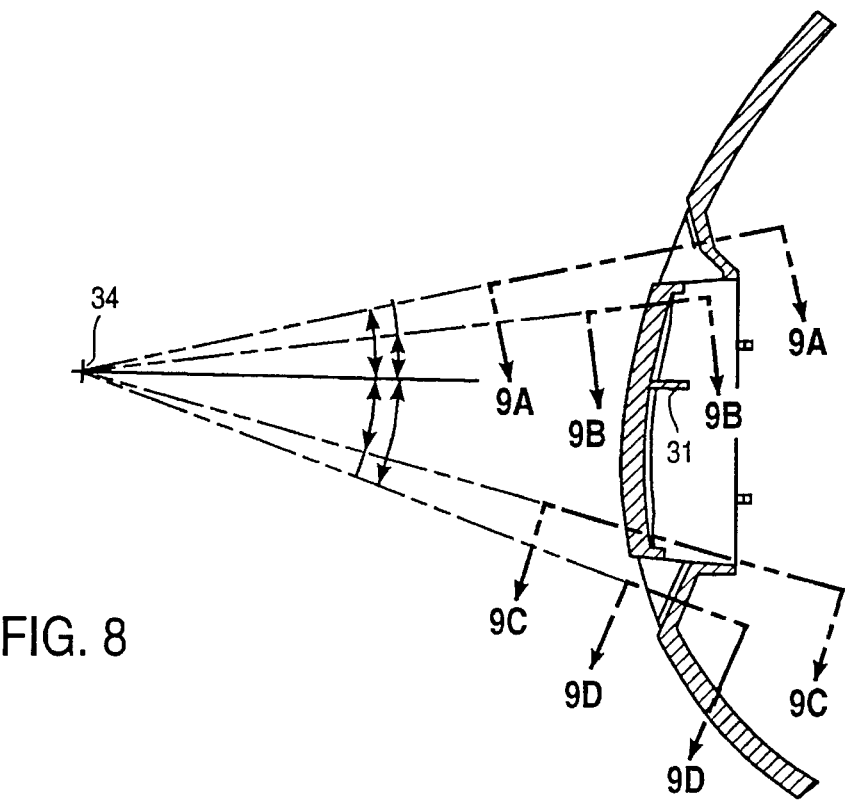
FIGS. 8 and 9A–9D illustrate a detailed vertical cross sections of the enclosure showing details of the detent mechanism and the path for the adjustable foot.
Figure 9A:
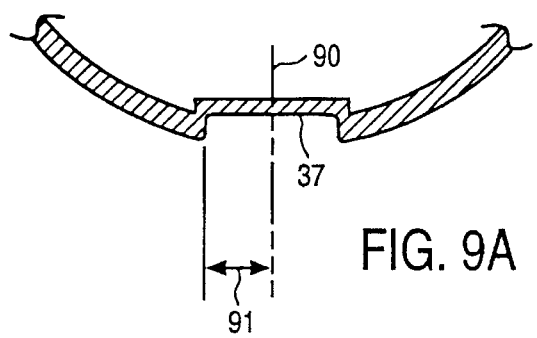
Figure 9D:
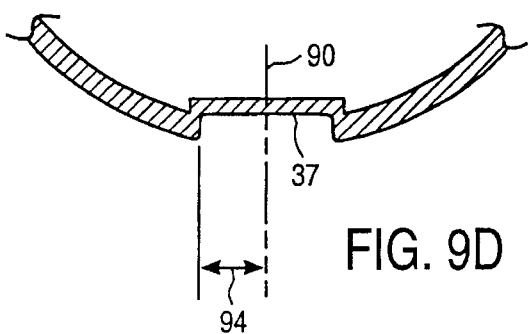
Figure 9B:
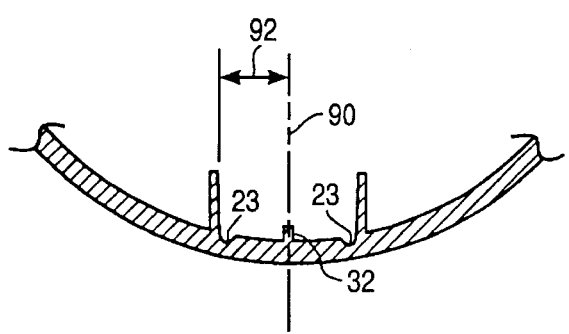
Figure 9C:
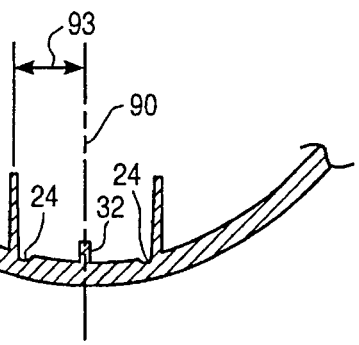
Figure 12:
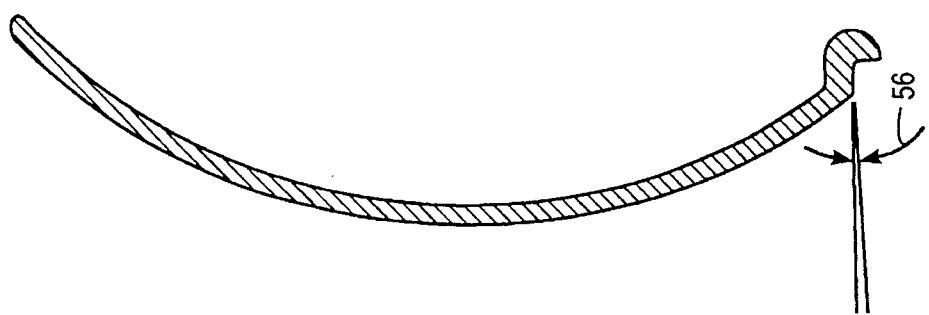
FIGS. 11 and 12 illustrates a vertical cross section of the foot at approximately the center of the foot (FIG. 11) and at an intermediate position (FIG. 12).
Figure 11:
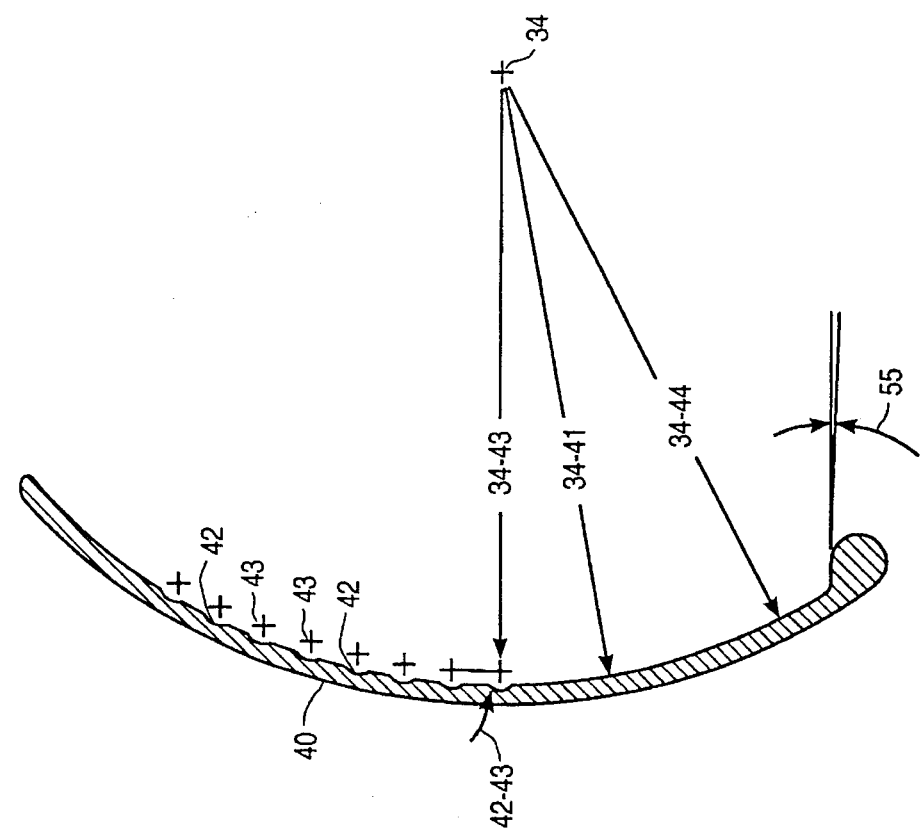
Figure 10:
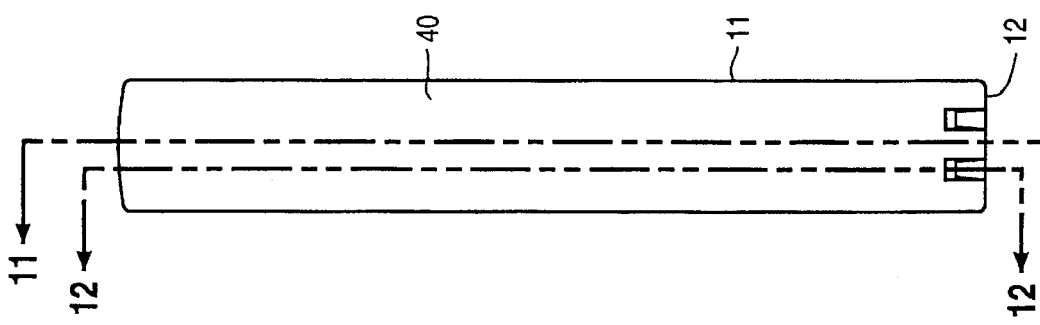
FIG. 10 illustrates a view of the forward-facing portion of the foot, the outer portion of the curve.

Referring to FIGS. 1, 2 and 3, enclosure 10 includes front, bottom contact points 14, raised front center section 13, and bottom 12 of adjustable foot 11 (also referred to herein as a "stand:)". In one preferred embodiment, the enclosure includes a speaker grill 15 and volume control 16. Adjustable foot 11 slides through upper opening 21 and lower opening 22 in housing 10. Enclosure 10 can tip forward and backward by rotating around a horizontal axis which is an essentially cylindrical element which contacts the supporting surface at contact points 14. Center section 13 is raised to accommodate a forward-curving aspect of the front of the speaker but could have been continued as the cylinder which includes contact points 14.

As adjustable foot 11 is moved to position 11' or other positions, the three point base formed by bottom contact points 14 and bottom 12 of adjustable foot 11 changes the angle of enclosure 10. This three point base is geometrically equivalent to a triangle which can pivot around one edge, namely the cylinder or line defined by bottom contact points 14. The exact dimensions of the triangle will change according to the specific position of adjustable foot 11.

The adjustable foot or stand is essentially an arc which cuts through the speaker cabinet. The stand can be moved with respect to the speaker cabinet about a rotational axis which is coincident with the arc's center. Since the bottom edge of the arc provides the third point of the speaker's three-point stance, the stance of the speaker changes as the stand is moved with respect to the cabinet. The center of rotation for the stand and the corresponding opening in the enclosure remains fixed, but since the lowest point of the arc formed by adjustable foot 11 moves up and down, enclosure 10 will tip accordingly.

The radius of the arc of the stand along with the location of the center point of the arc is important in determining the possible range of angular adjustment possible for the speaker assembly. In a preferred embodiment, the range of acceptable arc length is somewhat limited to provide based on appearance and to provide a reasonable human interface. Therefore, given a constant arc length, the basic concept behind the choice of radius is that as the radius of curvature is increased, the range of possible motion is also increased. The extreme case is when the radius of the arc becomes infinite, and the arc (the adjustable foot) itself becomes a straight line. For a given range of relative motion between the stand and the cabinet, this solution yields the greatest range of angular positions for the speaker assembly. However, the portion of possible positions which is stable compared to the entire range of possible positions is minimal in this extreme case. Therefore, a reasonable radius was chosen for the stand which would ensure that for a given range of motion between the stand and the cabinet, all possible positions would be stable. In a preferred embodiment, the radius is about ½ the height of the enclosure. In a particularly preferred embodiment, the enclosure is about 18 cm tall and the radius of curvature of the arc is about 9 cm. A radius as small as ¼ or as large as 10 or more times the height of the enclosure is preferred and a range of about 33% to about 200% of the height of the enclosure is particularly preferred.

The location of the center point of the arc, which is also the center of rotation for the stand, is important in obtaining a maximum range of possible positions given a fixed radius and arc length. For the radius and arc length chosen in one preferred embodiment, the center of rotation of the stand was chosen to lie somewhere near the axis of the speaker's transducer to provide a maximum range of possible positions for the speaker assembly. If the location of the center of the arc had been chosen such that the full circle described by the arc lay above the plane on which the speaker sat, for example, it would have then been impossible to put the speaker in a position in which the axis of the transducer is parallel to or pointed down at the sitting plane. (This position is potentially useful for a speaker if a user wants to place the speaker up high on shelves and have the transducers point in a downward direction.)

The design of the speaker stand and its interface with the cabinet is important to the audio functionality of the speaker. The stand is designed so that it is essentially a constant cross section swept about the point of rotation of the stand; the cabinet is then designed to match this swept section. This ensures that there is a constant fit between the stand and the cabinet, no matter what the relative position of the two. This also ensures a consistent environment in the cavity of the speaker. Having assured a fit which is independent of the relative position between the stand and cabinet, a tight fit between the two parts can be guaranteed, which is important in maintaining the speaker's high quality audio output.

Referring to FIGS. 7, 8, 11 and 13, center of rotation 34 is common to adjustable foot 11 and housing 10. Referring to FIGS. 10, 11, 12, 13 and 14A through 14D, adjustable foot 11 has outer-curve surface 40 and inner curve surface 44. The inner curve portion includes track 41 with detent depressions 42 and stops 45. The inner curve portion has a horizontal inner curvature with radius 51 from center 50 and thickens to a ridge 46 at each side. Radius 34–40 is the longest radius, with radii 34–41, 34–44, and 34–46 decreasing in order. In one preferred embodiment, these radii are 90 mm (34–40), 87.17 mm (34–41), 87 mm (34–44), and 84 mm (34–46), respectively. Radius 34–43 is dependent on the design of the detents, discussed below. In a preferred embodiment, this radius is 85.17 mm (34–43), with an additional radius 42–43 of 2.5 mm for each detent depression 42.

Referring to FIGS. 6, 7, 8, and 9A through 9D, each of the features described above for adjustable foot 11 have corresponding features in housing 10. Outer curve surface 40 mates with surface 37 near upper opening 21 and also near lower opening 22. Inner curve portion 44 mates with a matching profile in each of upper opening 21 and lower opening 22 (not shown in detail) to form a close fit. Ridge 46 mates with channels 23 and 24, each of which are profiled to smoothly join upper opening 21 and lower opening 22 respectively. Internal box 39 includes sidewalls 39A which accommodate the sides of adjustable foot 11 with a minimum of clearance. Detent 33 engages track 41 and detent depressions 42. Radius 34–37 (taken along center line 90) is the longest radius, with radii 34–36 and 34–32 decreasing in order. In one preferred embodiment, these radii are 90.10 mm (34–37), 86.80 mm (34–36), and 86.50 mm (34–32), respectively. Radius 34–38 is dependent on the design of the detents, discussed below. In a preferred embodiment, this radius is 85.17 mm, identical to radius 34–43, with an additional radius 38–33 of 2.5 mm for detent 33.

In a preferred embodiment, a detent feature was implemented in the interface between the stand and the cabinet to ensure that the stand would not collapse through the cabinet for any given speaker position, and to provide discrete feedback to the user as to what positions were possible. The detent feature utilized the curved shape of the stand and its inherent "spring-like" quality to implement the design without any additional parts. A positive bump was molded into the speaker cabinet and a series of mating recesses were molded into the speaker stand along the range of its travel. In a rest position, the positive bump protrudes into one of the mating recesses, which keeps the speaker assembly from readily falling into a different position. To change positions, then, the recess in the stand is forced past the positive bump in the cabinet, causing a momentary deflection which is easily accommodated by the arc of the stand, until the positive bump protrudes into a different recess in the stand.

Both cylindrical and spherical shapes were considered for the shape of the detent feature. A cylindrical shape was chosen based on the possibility of wear over time. A cylindrical positive bump compared to a spherical positive bump will take longer to wear down over a lifetime of cycling, and the cylindrical positive bump will wear more evenly as well.

Referring to FIGS. 4, 5, 6 and 7 showing horizontal and vertical cross sections of enclosure 10 (as indicated in FIG. 3), detent 33 is molded at the intersection of vertical rib 32 and horizontal rib 31. Detent 33 has a cylindrical shape in this preferred embodiment, but one skilled in the art will recognize alternative embodiments for a detent. Detent depressions 42 are molded into adjustable foot 11. As the adjustable foot 11 is moved, detent 33 alternatively engages track 41 and a detent depression 42. When detent 33 is matched to a detent depression 42, there is close to an exact match in dimensions (ideally it is exact) but when detent 33 engages track 41, there is a moderate interference. This interference can be accommodated by flexing adjustable foot 11. With proper selection of materials and cross sections of adjustable foot 11 one skilled in the art can adjust the flex to give a desired amount of tension as the adjustable foot 11 is moved.

This detent system is a significant improvement over prior art detent systems. The prior art teaches using at least three parts for a detent system, and often more. A typical detent system includes a housing, comparable to housing 10 and a moveable part, comparable to adjustable foot 11, but also includes a separate detent which must be tensioned (for example, by use of a separate spring or by making the detent from a flexible material) which rides in detent depressions, typically in the moveable part. One common prior art detent is a spring-loaded ball bearing. Another common detent is a metal bar with a raised end. Each of these prior art designs requires an extra part to provide the tension to secure the detent against the moving part. The new design requires only two components and so is cheaper and provides for much simpler manufacturing.

This constant cross section swept about a point is an interesting detail considering normal injection-molding practices. The side walls (which require draft for mold release) are usually drafted so that a constant angle with respect to the mold-release direction is maintained. In order to accomplish the design requirement of the interface between stand and cabinet, a continuously variable angle of draft with respect to mold-release direction is required. In other words, the surfaces requiring draft go from being planar to being conical.

Referring to FIGS. 14A, 14B and 14C, angles of draft 52, 53 and 54 preferably are approximately identical. In a preferred embodiment, this angle is about 2 degrees. In prior art moldings, these angles would not be identical but rather would follow a planar section along the length of adjustable foot 11. Referring to FIGS. 9A through 9D, in a similar manner, angles of draft 91, 92, 93, and 94 (each relative to centerline 90) preferably are approximately identical. In a preferred embodiment, this angle is about 2 degrees. These matching angles provide for a close fit of adjustable foot 11 in housing 10. Each of angles of draft 55 and 56 (FIGS. 11 and 12) preferably are about 2 degrees.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. An enclosure with an adjustable foot comprising:
   a main enclosure, including
      an edge for contacting a surface upon which the enclosure may be positioned,
      a horizontal axis of rotation near said one edge such that said main enclosure can pivot around said one edge, and
      a channel to accommodate an adjustable foot,
   said adjustable foot passing through said main enclosure, slidable engaging said channel in said main enclosure, said foot offset from said horizontal axis of rotation so said foot and said one edge form a stable support for said enclosure.

2. The enclosure of claim 1 wherein said adjustable foot is designed to fit said channel so that there is no more than about 0.5 millimeters clearance at any point.

3. The enclosure of claim 1 wherein said adjustable foot has an arctuate cross section.

4. An enclosure with an adjustable foot comprising:
   a main enclosure, including
      an edge for contacting a surface upon which the enclosure may be positioned,
      a horizontal axis of rotation near said one edge such that said main enclosure can pivot around said one edge, and
      a channel to accommodate an adjustable foot.
   an adjustable foot passing through said main enclosure, slidably engaging said channel in said main enclosure, said foot offset from said horizontal axis of rotation so said foot and said one edge form a stable support for said enclosure,
   a detect incorporated in said main enclosure,
   a plurality of detent recesses in said adjustable foot, whereby said detent can engage at least one of said detent recesses in at least one position of said adjustable foot passing through said main enclosure.

5. The enclosure of claim 4 where said main enclosure is a speaker enclosure having certain acoustic characteristics and wherein said adjustable foot can be positioned at a plurality of locations with substantially no effect on said acoustic characteristics of said speaker enclosure.

* * * * *